UNITED STATES PATENT OFFICE.

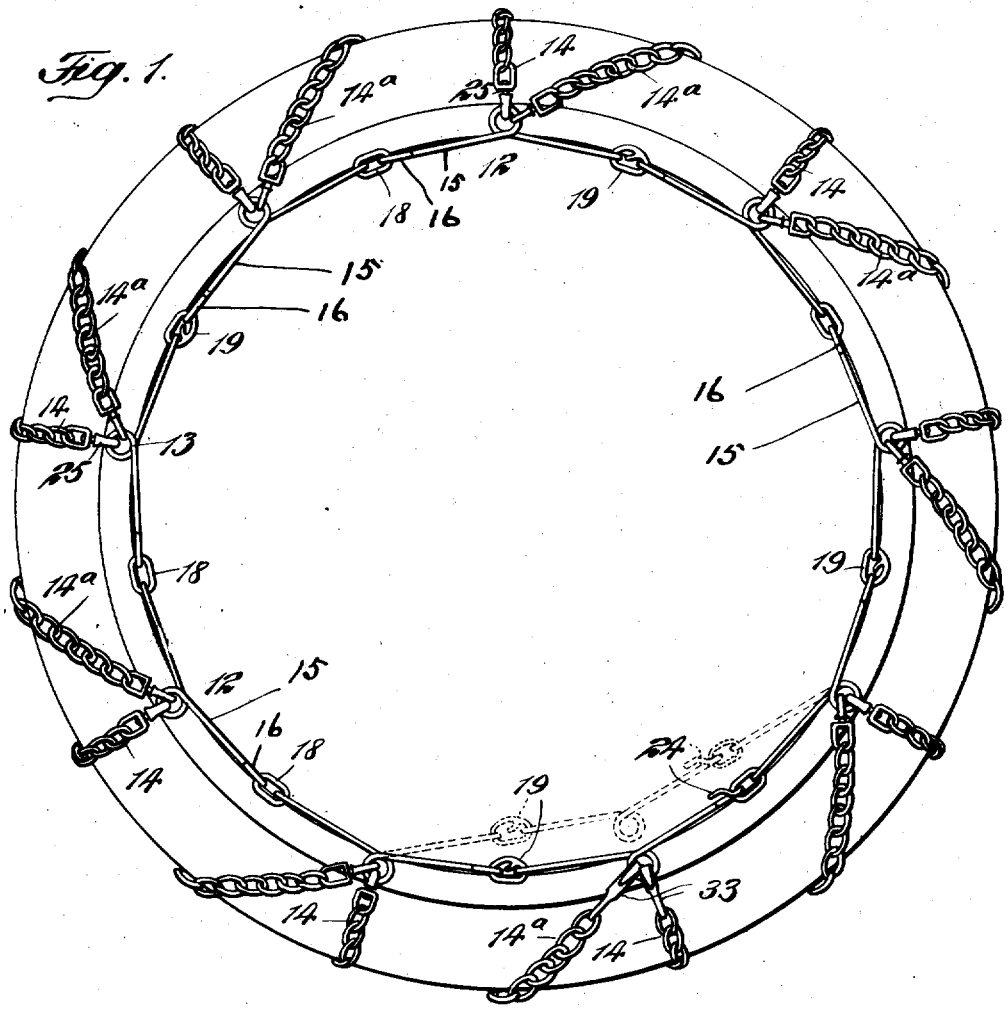

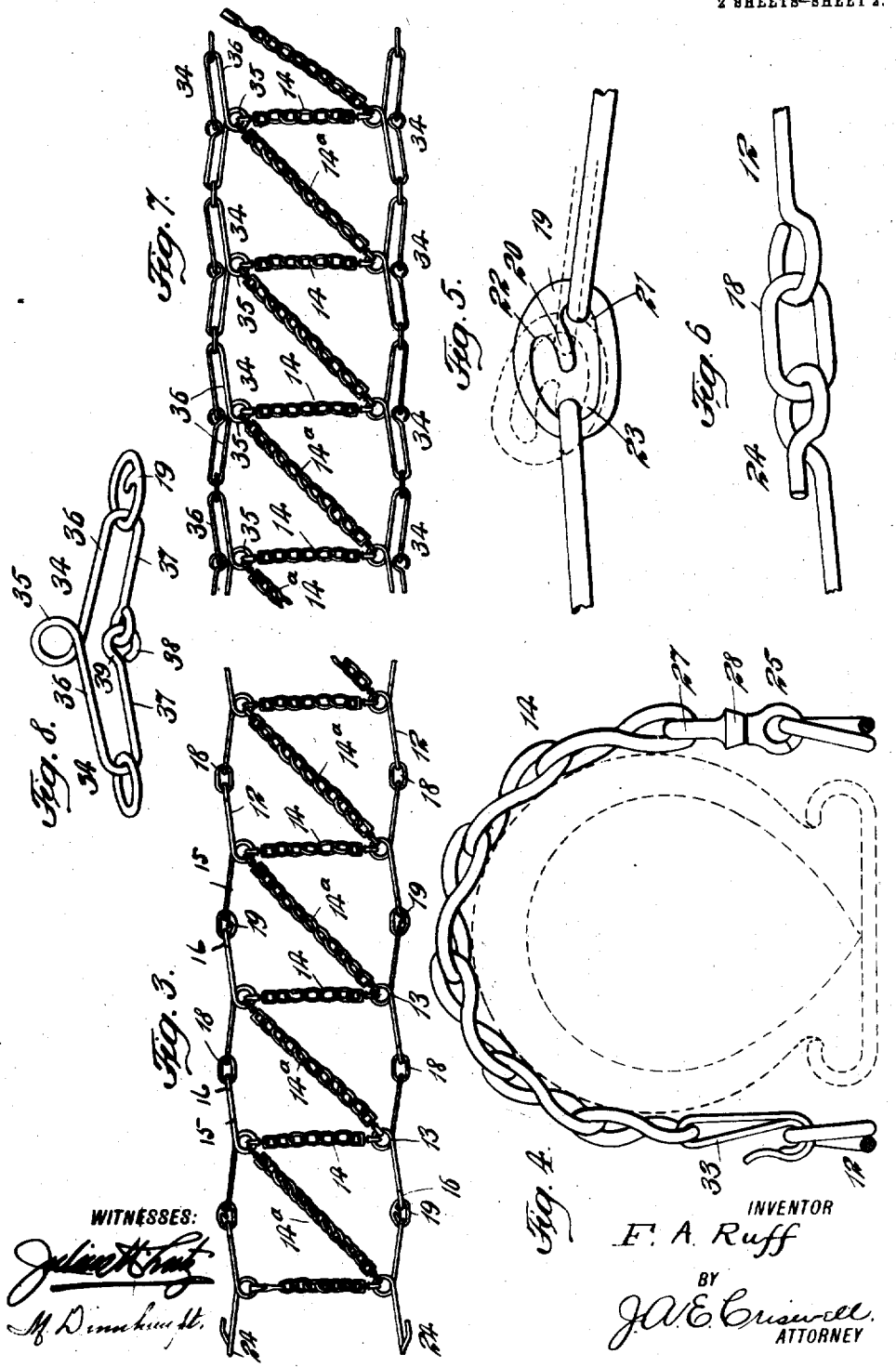

FREDERICK A. RUFF, OF NEWARK, NEW JERSEY.

ANTISKIDDING DEVICE.

973,976.  Specification of Letters Patent.  Patented Oct. 25, 1910.

Application filed December 21, 1909. Serial No. 534,264.

*To all whom it may concern:*

Be it known that I, FREDERICK A. RUFF, a citizen of the United States, and a resident of Newark, county of Essex, and State of New Jersey, have invented certain new and useful Improvements in Antiskidding Devices, of which the following is a full, clear, and exact description.

This invention relates more particularly to anti-skidding devices for vehicle wheels.

The primary object of the invention is to provide simple and efficient means whereby the length of the device when placed about the wheel or other element may be shortened or lengthened to vary the tension or gripping effect of the tread members on the wheel tire and to adapt the same to compensate for variations in the size of the wheel, and which device is so constructed that the tread chains or elements passing about the tire casing will positively grip the same and be so held that they will creep or move slightly one at a time and in succession and the whole device shifted after the movement of the tread elements, thus preventing the chain from remaining constantly in one place, as might be the case if not permitted to move, and at the same time causing the gripping element to have a better holding effect upon the ground as the wheel rotates.

Another object of the invention is to provide simple and efficient means for holding the ends of the side members together so that the same may be quickly applied to or detached from the wheel without the necessity for jacking or raising the wheel.

With these and other objects in view, the invention will be hereinafter more particularly described with reference to the accompanying drawings, which form a part of this specification, and will then be pointed out in the claims at the end of the description.

In the drawings, Figure 1 is a side elevation of one form of device embodying my invention, showing the same applied to an automobile wheel. Fig. 2 is a detail plan view, partly in section, of one of the tread or chain members. Fig. 3 is a detail plan of a part of the device removed from the wheel. Fig. 4 is a transverse section of the device showing how the same fits about the tire of the wheel, the latter being shown in dotted lines and the particular tread member shown being the one having its end detachable for placing a tension on the device when its free end is fastened to one of the side members. Fig. 5 shows how the side members may be lengthened or shortened by movement of one of the connecting links. Fig. 6 shows how the free ends of the device may be held together. Fig. 7 is a partial detail plan showing how the side links may have a limited yielding movement; and Fig. 8 is a detail perspective view of one of the side links shown in Fig. 7.

The device has two side members adapted to be located on opposite sides of the wheel when in use. Each side member comprises a plurality of yielding connecting members, parts or links 12 each of which has a loop portion 13 to which the ends of the chain or tread members 14 and 14ª are adapted to be held. These members or devices 12 have arms 15 extending on opposite sides of the loop portion 13, so that said loop portion will yield properly under tension, and said arms 15 extending on opposite sides of the connected to links 18 and 19. The links 18 may be of the usual short connecting elements of the usual construction, and said links may not only serve to connect the yielding members 12 together, but may also serve as means for the attachment of additional chains or tread elements in addition to the use of the loop portion 13 or independent thereof as preferred.

The links or elements 19 are constructed in such a way as will bring the ends of the members 12 closer together or to move the same apart to shorten or lengthen the side members and thereby vary the tension of the chain or tread elements and the gripping effect of the same on the wheel tire. As shown each link 19 has a projecting part 20 forming a substantially U-shaped opening through the body portion thereof and provides a plurality of engaging portions 21, 22 and 23 for the ends of the members 12. As will be seen, the part 22 is at a less distance from the part 23 than the engaging part 21, so that in the position shown in Fig. 5 in full lines, the greatest distance occurs between the ends of any two adjoining members 12, while if rotary movement is given to the link, the distance between the end is shortened as shown in dotted lines, thus correspondingly shortening the length of the side members. The links 19 have a cam-like action and rotary movement and are opposed to each other so that both side members can be correspondingly shortened or lengthened, and said links 19 serve as an effective means for shortening said side members to adjust and impart proper tension to the tread members or elements.

Each side member has at one end one of the links 18 held to the arms of the members 12, and at the opposite end of said side members, the ends 24 of the end members 12, Figs. 3 and 6, are adapted to be hooked into the connecting links 18 so as to be detachable therefrom. The ends 24 are extended and so formed as to overlap a part of the arm to require the links to be forced past the same and thus held against accidental detachment, as the links can be forced by the overlapping end 24 by reason of the members 12 being made of steel or yielding wire, though said members may be made of any suitable material and in any desired way.

A swivel connection or device 25 is held to the ends of the tread members which are permanently attached to the side members and these swivels comprise two members 26 and 27. The part or member 27 forms an eye which is held to the outer link of the chain member 14 and has a socket portion 28 in which is rotatively held the stem 29 of the attaching member 26. This attaching member 26 may be made of malleable iron and is so formed that the loop portion 13 of the members 12 may be forced into the space or opening 30, and the end 31 forced over as shown in dotted lines in Fig. 2 to form a substantially circular opening in which the said loop portion of one of the members 12 is adapted to fit. This swivel forms an important function in connection with the tread members and permits proper movement of the same, and by constructing the said swivel or device 25 in the manner shown, a very simple and effective tread element is provided which may be readily attached to and permanently secured to the members 12 or to the links 18 or 19 as desired, though ordinarily one or more of said chains or tread members as for example, the tread member 14, Figs. 1 and 4, have a hooked device 33 which is adapted to engage the eye of one of the side members. The purpose of having one or more of the tread members permanently fixed to one of the side members and detachable at its other end is to give tension to the side members and to permit the same to be readily applied to the vehicle wheel.

The side members of the device, as applied to the vehicle wheel, when one of the chain members is free, will assume in part the position shown in dotted lines in Fig. 1, but when the free end of said tread member is fastened to the side members, it will cause the same to be forced outward to the position shown in full lines thus increasing the tension of the device about the wheel tire.

When desired and particularly for large cars or vehicles, I prefer to limit the yielding movement of each of the side links by using links of the form indicated at 34 34, in order that the side members will not stretch too much or lose their resiliency as it is desired that the device be held against free movement about the tire, and in some cases where the yielding effect of the side links are not limited, they sometimes stretch and remain in this position and ultimately destroy the gripping effect desired. To this end, I provide each side member with a plurality of links connected together in the manner similar to that already described, and each side link 34 has a looped portion 35 for the attachment of the tread chains or members 14 and 14$^a$. Each link or member 34 has arms 36 extending on opposite sides of the looped portion 35 and instead of said arms being connected direct to the links as in the other form, the said arms are extended inward in substantially parallel relation to the arms 36, as at 37, and each inwardly-extending part or arm has an eye 38 each interlocked with the eye of the arm or inwardly-extending portion 37 of the other arm. The two arms 36 and 37 form a loop or attaching part for the short links 18 and 19, and the eyes 38 are so made as to give a certain play or freedom of movement to the side links by reason of the yielding loop 35, but this movement is limited by the size of the opening 39 of the eyes or hooked portion 38. As will be seen when the side members are acted upon by an unusual weight, or for other reasons, each side link 34 will yield a limited distance and then will be stopped by the interlocking eyes 38 so that the resilient effect of the looped portion 35 will not be destroyed. This construction may be used in combination with the side links 12 or may entirely displace the same if desired.

It will be seen that the tread chains 14$^a$ are angularly arranged with respect to the tread chains 14, and this provides more effective means to avoid skidding, though either set of chains may be used independent of the other.

From the foregoing, it will be seen that a simple and efficient device is provided which may be readily lengthened or shortened to vary the tension of the device; that simple means is provided for holding the yielding members together; that simple means is provided whereby an effective connection is formed between the tread elements and side members of the device; that said device is so constructed and the tension so formed that the said device will cause its tread elements to creep one at a time in succession and then the whole device moves bodily but only a relatively short distance at each movement; that said device provides effective means for holding and preventing slipping or skidding of the tire of the wheel; that simple means is provided to limit the yielding effect of the side members; and that said device may be easily constructed and applied to a wheel and the necessity for jacking the wheel or otherwise lifting the vehicle from the ground is overcome.

Having thus described my invention, I claim as new and desire to secure by Letters Patent:—

1. A device of the character described, comprising two side members having yielding links, cam links connecting the yielding links together in such a way as to shorten or lengthen the same at will, and a plurality of transversely-extending chains connected to the side members and passing about the tire.

2. A device of the character described, comprising two linked side members arranged in parallel relation and each comprising a plurality of linked members having a looped portion with oppositely-extending arms forming a yielding part for each linked member and each arm having a hooked end, and a plurality of rotary and cam-acting links connected to certain of the linked members, and a plurality of transversely-extending tread chains connected to the side members.

3. A device of the character described, comprising side members formed of a plurality of parts, tread members joining the side members together, and a plurality of links connecting the parts of the side members together and comprising a body portion having a projecting part forming a series of engaging portions and adapted when rotated to shorten or increase the distance between the ends of said parts of the side members.

4. A device of the character described, comprising side members formed of a plurality of parts, tread members joining the side members together, and a plurality of cam-acting links connecting the parts of the side members together and comprising a body portion having an inwardly-projecting part forming a series of engaging portions and adapted when rotated to shorten or increase the distance between the ends of said parts of the side members.

This specification signed and witnessed this 20th day of December A. D. 1909.

FREDERICK A. RUFF.

Witnesses:
  W. A. TOWNER, Jr.,
  M. DINNHAUPT.